United States Patent [19]
Malden et al.

[11] Patent Number: 5,489,183
[45] Date of Patent: Feb. 6, 1996

[54] HAND TRUCK FOR HANDLING CYLINDERS OF COMPRESSED GAS AND THE LIKE

[75] Inventors: Lavern E. Malden; Robert R. Sanchez; Manuel R. Cisneros, Jr., all of San Antonio, Tex.

[73] Assignees: Sony Corporation, Tokyo, Japan; Sony Electronics Inc., Park Ridge, N.J.

[21] Appl. No.: 365,239

[22] Filed: Dec. 28, 1994

[51] Int. Cl.⁶ .................................... B62B 1/08
[52] U.S. Cl. .................. 414/490; 280/47.28; 280/47.29
[58] Field of Search .................... 414/444–449, 414/490; 280/47.27, 47.28, 47.29; 254/2 R, 2 C, 5 R, 5 C, 7 R, 7 C

[56] References Cited

U.S. PATENT DOCUMENTS

| | | | |
|---|---|---|---|
| 2,477,294 | 7/1949 | Fuller | 414/448 |
| 2,514,825 | 7/1950 | Zenko | 280/47.28 |
| 2,598,489 | 5/1952 | Bayer et al. | 414/467 |
| 2,654,493 | 10/1953 | Kernkamp | 414/448 |
| 3,850,441 | 11/1974 | Peter et al. | 280/47.27 X |
| 4,009,891 | 3/1977 | Jensen | 280/47.27 X |
| 4,257,729 | 3/1981 | Morissette | 414/490 |
| 4,728,245 | 3/1988 | Shelton | 414/490 |
| 4,737,065 | 4/1988 | Ju | 414/490 |
| 5,180,179 | 1/1993 | Salvucci . | |
| 5,201,638 | 4/1993 | Bieri . | |
| 5,290,051 | 3/1994 | Olson | 414/490 X |

FOREIGN PATENT DOCUMENTS

| 0649040 | 9/1962 | Canada | 414/444 |
|---|---|---|---|

OTHER PUBLICATIONS

Lab Safety Supply 1994 General Catalog, Fall/Winter Edition, pp. 374, 380 and 456.

Primary Examiner—Michael S. Huppert
Assistant Examiner—James W. Keenan
Attorney, Agent, or Firm—Ronald P. Kananen

[57] ABSTRACT

In order to facilitate the weighing of large compressed gas cylinders, a hand truck which is used to move the cylinders to a set of scales is provided with a hydraulic or mechanical servo which allows the cylinder to be elevated while it is on the hand truck to a height suitable for off-loading into the scales platform.

5 Claims, 3 Drawing Sheets

HAND TRUCK FOR HANDLING CYLINDERS OF COMPRESSED GAS AND THE LIKE

BACKGROUND OF THE INVENTION

1. Field of the Invention

The present invention relates to a manually-operated hand truck. More specifically the present invention relates to a hand truck which is provided with a mechanical or hydraulic type of servo device that allows cylinders which are loaded onto the hand truck to be lifted to a height suitable for transfer onto scales or the like type of apparatus.

2. Description of the Related Art

FIGS. 1 and 2 show two different types of currently available dollies and hand trucks for handing heavy loads and compressed gas cylinders.

The hand truck shown in FIG. 1 includes a frame 10 which is supported by two wheels 12, 12 and arranged to have a shelf-like platform member 14 which rests on the ground when the device is titled forward to an upright position. With this type of hand truck, it is possible to transport different loads from one point to another. However, once this type of the hand truck is tilted back to a position wherein an operator can walk it forward, the weight of the load which is supported on the platform 14 tends to produce a moment of force that tends to force the handle portion 16 of the frame 10 toward the ground. The operator is therefore obliged to control the angle at which the hand truck is tilted during motion in order to avoid strain on his or her arms. Further, this type of hand truck or cart is not particularly suited to transporting cylinders of compressed gas due to the possibility of the operator loosing grip of the handle 16 and allowing the hand truck to fall with the result that upper ends of cylinder may hazardously strike against the ground.

Under these circumstances, a hand truck of the nature shown in FIG. 2 is preferred in that, after a long object such as a gas cylinder 20 is loaded onto the platform 22 and the hand truck is pulled back to an angle at which forward motion is possible, the rear casters 24 contact the ground and limit the amount of rotation through which the frame 26 can be induced by the weight of the load.

However, while this device is simple and solves the drawbacks encountered with the type of truck shown in FIG. 1, a problem is encountered when moving a cylinder 20 from a storage site or the like to a set of scales to check the weight of the cylinder 20 such as is required when checking if the cylinder 20 contains the correct amount of gas. That is to say, the platform of the scales is usually above the level of the floor and it is usually required that the cylinder be off-loaded from the hand truck and then manually manhandled onto the scale platform by rolling the cylinder along its lower edge up a small ramp. After the weighing operation, the reverse process is necessary.

As will be understood, this process can be quite hazardous in that the cylinder must be tilted at an angle in order to roll the cylinder up and down the ramp. Under these conditions, the heavy and awkward-to-maneuver cylinder can cause back injuries or worse still, may be dropped with the risk of damaging the cylinder and risking uncontrolled release of compressed gas.

SUMMARY OF THE INVENTION

It is an object of the present invention to provide a hand truck which can allow a cylinder to be loaded onto a platform of the truck at ground level and then directly off-loaded onto a scale platform which is located at a level that is higher than ground level.

It is a further object of the invention to provide a hand truck which includes a servo such as a hydraulic cylinder or a mechanical jack type screw thread arrangement which enables a cylinder to be elevated after it is loaded onto the hand truck.

In brief, the above objects are achieved by a hand truck which is used to move cylinders to a set of scales which is provided with a hydraulic or mechanical servo that allows the cylinder to be elevated while it is on the hand truck to a height suitable for off-loading onto the scales platform.

An important aspect of the present invention resides in a manually operable hand truck which features: a frame having a handle; a plurality of wheels operatively connected with the frame at a lower portion thereof; a first platform rigid with the frame; a second platform which slidably supported on the frame; and a servo mechanism for sliding the second platform along the frame.

BRIEF DESCRIPTION OF THE DRAWINGS

The various features and advantages of the invention will become more clearly appreciated as a detailed description of the preferred embodiments is given with reference to the appended drawings in which.

DETAILED DESCRIPTION OF THE PREFERRED EMBODIMENTS

Figure 1:
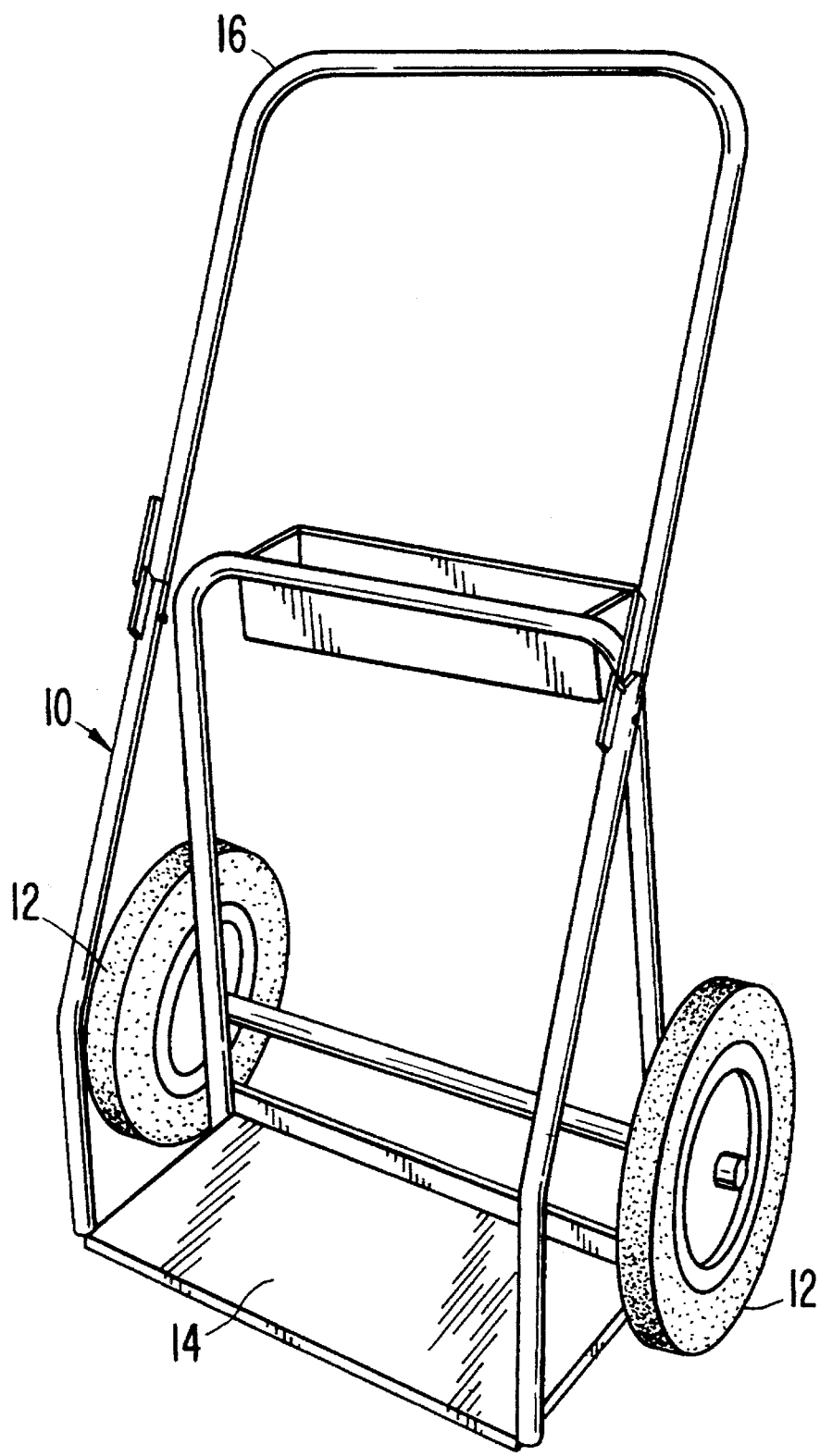
FIG. 1 is a perspective view of a prior art type of hand truck which was briefly described in the opening paragraphs of the disclosure.
Figure 2:
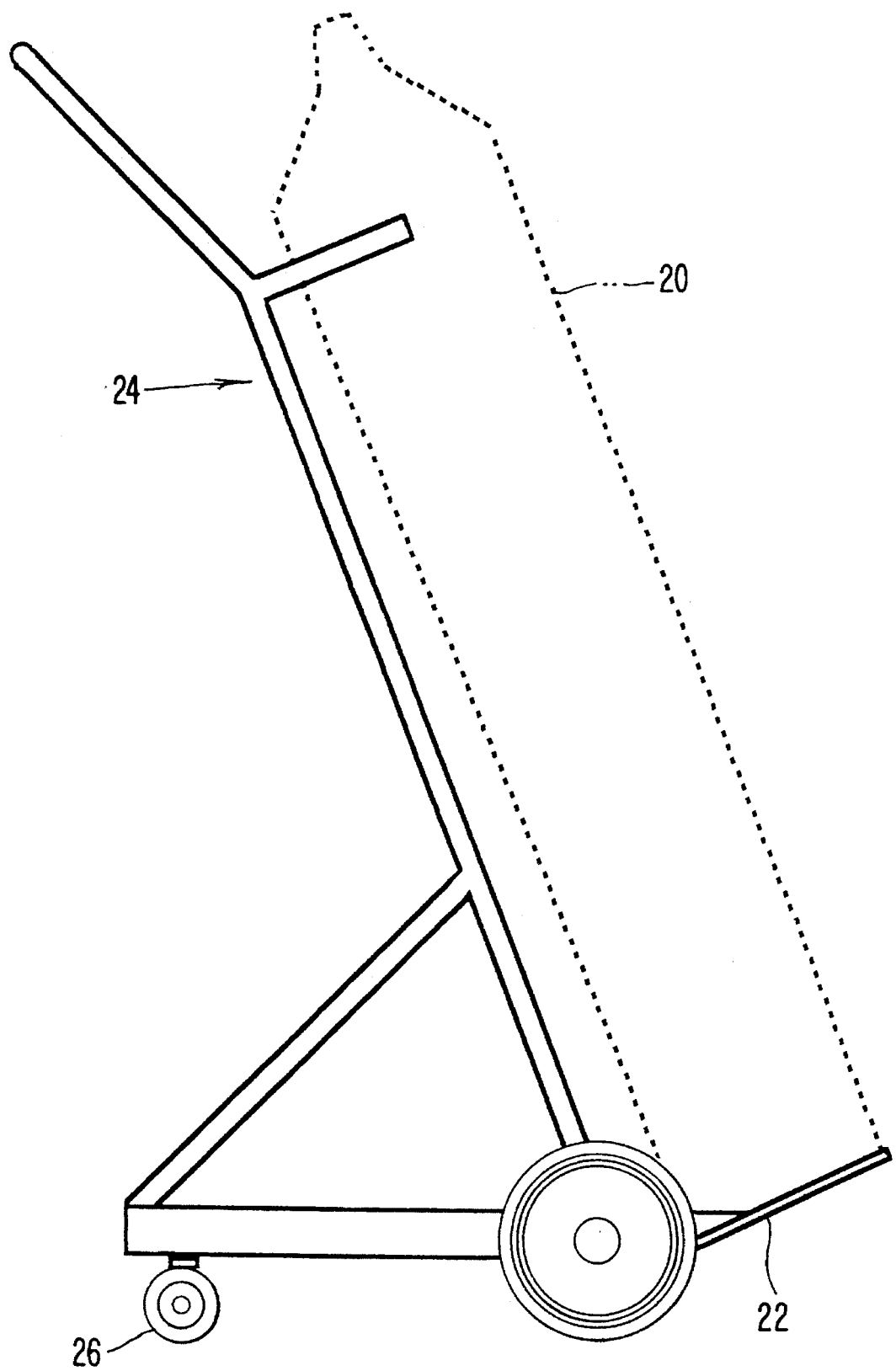
FIG. 2 is a side elevation of a second prior art hand truck which was briefly described in the opening paragraphs of the disclosure.
Figure 3:
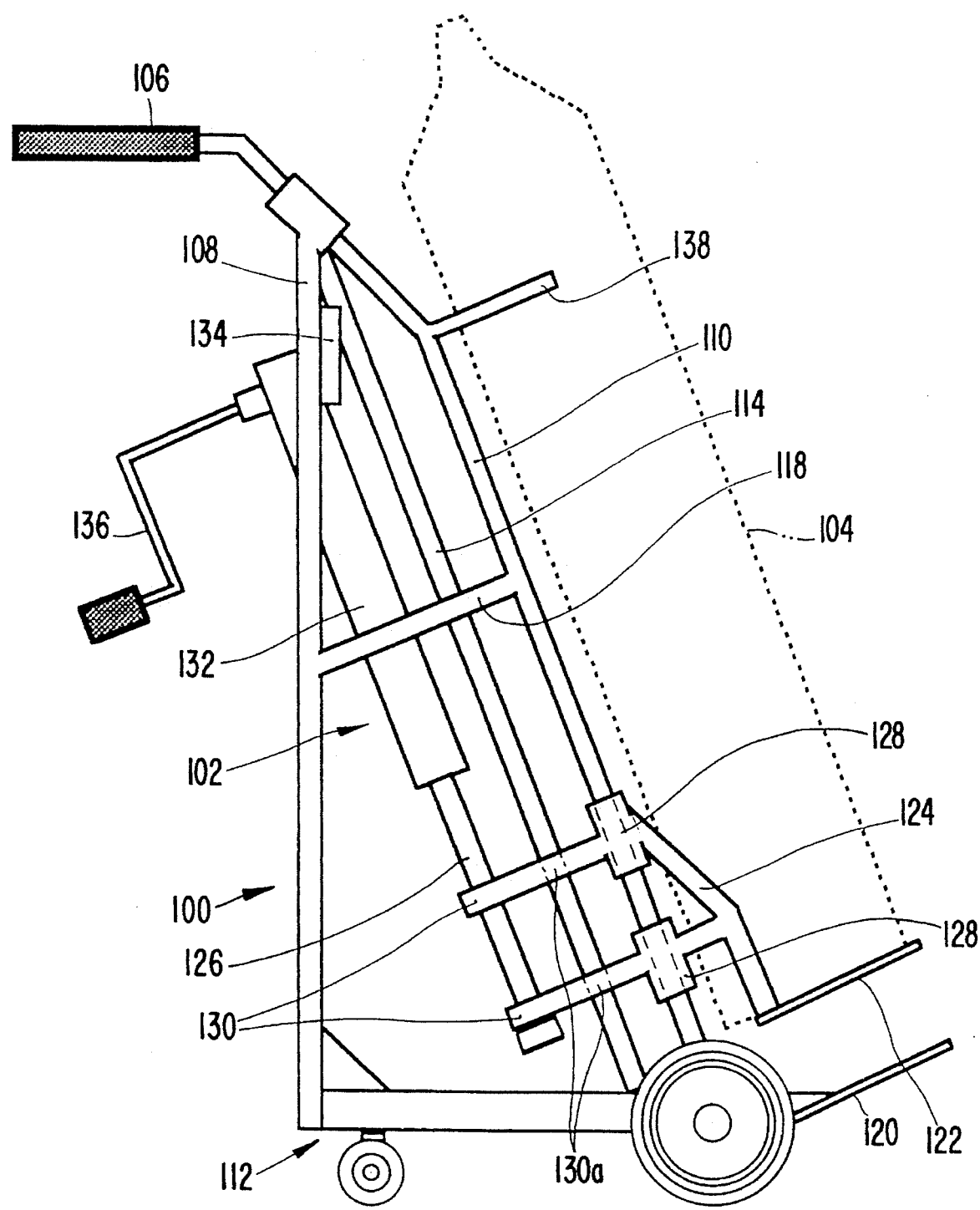
FIG. 3 is a side elevation of an embodiment of the invention.

FIG. 3 shows an embodiment of the invention. This arrangement includes a frame generally denoted by the numeral 100 and a mechanically driven elevator platform servo 102 which enables the upper platform of a double platform arrangement to be moved upward to a level at which a cylinder 104 can be off-loaded onto a scale platform.

More specifically, the frame 100 includes a pair of handles 106 which are rigid with a pair of essentially A-shaped side frames comprised of a pair of "vertical" rear struts 108 and a pair of "angled" front struts 110. The vertical rear struts 108 are connected with a rectangular lower frame 112 at its rear corners while the two front angled struts 110 are connected to the lower frame 112 at its forward corners. A third angled strut 114 is located mid-way between the two front struts 110 and set back by a predetermined amount to establish a triangular relationship. A pair of side braces 118 interconnect the vertical struts 108 with the two angled front struts 110 in the illustrated manner.

A lower platform 120, provided along the front of the hand truck according to the present invention, is rigidly connected with front edge of the lower frame 112. A second upper platform 122 is connected with a support structure 124 which is arranged to be slidably supported on the three angled struts 110, 110 and 114, and connected to an extensible lower half 126 of the servo 102. The support structure 124 is provided with boss-like members 128 which are slidably disposed on the angled struts 110 and a pair of flat rearwardly extending bracket members 130 which are formed with coaxially aligned bores 130a through which the third angled strut 114 passes.

The upper half 132 of the servo 102 is rigidly connected with the upper portion of the frame 100 by way of a laterally extending bracket 134. An additional connection is also established between the side braces 118 and the upper half of the servo 102.

A crank handle 136 is connected with the upper end of the upper half of the servo 102 to enable the servo to be selectively lengthened and shortened. In this embodiment, the servo comprises a screw jacket type construction.

A cradle frame 138 is provided at the front of the frame 100 to support the upper portion of the cylinder 104. Although not illustrated, it will be appreciated that a chain or strap, which can be passed around the cylinder, can be provided on the cradle frame 138 or adjacent thereto to secure the cylinder safely in place.

Although FIG. 3 shows the upper platform 122 raised to a position wherein the cylinder 104 could be off-loaded onto a scale platform, it will be appreciated that the upper platform 122 is arranged so that it can be lowered flat onto the upper surface of the lower platform 120 for off and on loading of the cylinders at floor level.

It will be appreciated that the lower platform 120 serves as a rest which contacts the ground and allows the frame 100 to rest in a fully upright position, wherein the cylinder 104 is vertically oriented and maintained in an elevated position suitable for off-loading onto a scale. The lower platform 120 also serves a safeguard which arrests the downward movement of the upper platform 122 in case the servo mechanism fails and the cylinder 104 is allowed to unexpectedly lower toward the ground either during transit or during on/off loading from a scale.

It will be appreciated that the present invention is not limited to the specific structure disclosed and illustrated in FIG. 3 and that various changes and modifications can be made without departing from the scope of the present invention which is limited only by the appended claims.

What is claimed is:

1. A manually operable hand truck comprising:
   an essentially A-shaped frame having:
      a horizontal rectangular base frame member having front and rear corners,
      a pair of vertically extending struts extending upward from the rear corners of said rectangular base frame member, said vertically extending struts having lower ends which are rigidly connected with said rectangular base frame member,
      a pair of angled front struts which extend up from the forward corners of said rectangular base frame member, said pair of angled front struts having lower ends which are rigidly connected with said rectangular base frame member and upper ends which are rigidly connected with upper portions of said pair of vertically extending struts,
      a third angled strut which is arranged to establish a triangular relationship with said pair of front struts and which extends up from said rectangular base frame member to an upper portion of said essentially A-shaped frame, said third angled strut being rigidly connected to said rectangular base frame member and the upper portion of said essentially A-shaped frame;
   a handle which is rigidly connected to the upper portion of said essentially A-shaped frame;
   a pair of wheels provided at the front corners of said rectangular base frame member;
   a pair of casters which are provided at the rear corners of said rectangular base frame member;
   a first platform rigid with said rectangular base frame member;
   a second platform slidably supported on said pair of angled front struts and said third angled strut; and
   a servo mechanism rigidly connected with said essentially A-shaped frame for sliding said second platform along said pair of angled front struts and said third angled strut.

2. A manually operable hand truck as set forth in claim 1, wherein said second platform is arranged over said first platform such that it can rest on the upper surface of said first platform.

3. A manually operable hand truck as set forth in claim 1, wherein said servo mechanism comprises a cylinder which is rigidly connected with said frame and an extensible shaft which is telescopically received in said cylinder and which is connected to said second platform.

4. A manually operable hand truck as set forth in claim 3, wherein said cylinder is rigidly connected with said frame so as to be essentially parallel with said pair of angled front struts.

5. A manually operable hand truck as set forth in claim 3, wherein said servo mechanism has a manually manipulable crank handle to control the degree of extension of said shaft from said cylinder.

\* \* \* \* \*